US012749006B1

(12) United States Patent
Dressler et al.

(10) Patent No.: US 12,749,006 B1
(45) Date of Patent: Sep. 29, 2026

(54) HYPERPARAMETER SELECTION

(71) Applicant: Dressler Consulting LLC, Merrick, NY (US)

(72) Inventors: Christopher Dressler, Merrick, NY (US); Andro Sabashvili, Tbilisi (GE)

(73) Assignee: Dressler Consulting LLC, Merrick, NY (US)

( * ) Notice: Subject to any disclaimer, the term of this patent is extended or adjusted under 35 U.S.C. 154(b) by 1252 days.

(21) Appl. No.: 17/379,260

(22) Filed: Jul. 19, 2021

(51) Int. Cl.
*G06N 20/00* (2019.01)
*G06F 18/20* (2023.01)
*G06F 18/21* (2023.01)
*G06F 18/2113* (2023.01)
*G06N 3/092* (2023.01)
*G06N 3/0985* (2023.01)

(52) U.S. Cl.
CPC ......... *G06N 20/00* (2019.01); *G06F 18/2113* (2023.01); *G06F 18/217* (2023.01); *G06F 18/29* (2023.01); *G06N 3/092* (2023.01); *G06N 3/0985* (2023.01)

(58) Field of Classification Search
CPC ...... G06N 20/00; G06N 3/092; G06N 3/0985; G06F 18/2113; G06F 18/217; G06F 18/29
See application file for complete search history.

(56) References Cited

U.S. PATENT DOCUMENTS

| | | | | |
|---|---|---|---|---|
| 12,223,407 B2 * | 2/2025 | Wang | .................. | G06F 18/2148 |
| 2016/0132787 A1 * | 5/2016 | Drevo | .................... | G06N 20/10 706/12 |
| 2021/0174246 A1 * | 6/2021 | Triplet | .................. | G06N 3/082 |
| 2021/0224585 A1 * | 7/2021 | Schmidt | ................ | G06F 9/3836 |

OTHER PUBLICATIONS

Li, Lisha, et al. "Hyperband: A novel bandit-based approach to hyperparameter optimization." Journal of Machine Learning Research 18.185 (2018): 1-52. (Year: 2018).*

Li, Liam, et al. "Massively Parallel Hyperparameter Tuning." arXiv preprint arXiv:1810.05934 (2018). Referred to in the office action as "Jameison" (Year: 2018).*

Jasrasaria, Dipti, and Edward O. Pyzer-Knapp. "Dynamic Control of Explore/Exploit Trade-Off In Bayesian Optimization." arXiv preprint arXiv:1807.01279 (2018). (Year: 2018).*

(Continued)

*Primary Examiner* — Michelle T Bechtold
*Assistant Examiner* — Nicholas S Wu
(74) *Attorney, Agent, or Firm* — Armis IP Law, LLC

(57) ABSTRACT

Hyperparameter configuration selection evaluates a plurality of hyperparameter configurations applicable to a machine learning (ML) model. Each hyperparameter configuration is iteratively evaluated for a performance and a reward distribution indicating that the evaluated performance will remain stable during successive iterations. Hyperparameter configurations are ranked or graphed based on the randomly drawn value from the reward distribution evaluated for each hyperparameter configuration. Reward distribution helps in determining when a potential for improvement from additional iterations has subsided and therefore hyperparameter configurations that may appear as underperformers may continue iterative performance evaluations until a sufficient probability of performance is attained.

15 Claims, 5 Drawing Sheets

(56) References Cited

OTHER PUBLICATIONS

Agnihotri & Batra, "Exploring Bayesian Optimization", Distill, 2020. (Year: 2020).*
"Multi-armed bandit", 2021, Wikipedia. (Year: 2021).*
Nguyen, Vu, Sebastian Schulze, and Michael Osborne. "Bayesian optimization for iterative learning." Advances in Neural Information Processing Systems 33 (2020): 9361-9371. (Year: 2020).*

* cited by examiner

HYPERPARAMETER SELECTION

BACKGROUND

Machine learning has evolved and extended a technology formerly labeled as Artificial Intelligence, or AI, still often used for collectively describing the general field. Modern approaches to computer based inference and learning include a number of approaches and derivations; the major algorithms include neural networks, decision trees, and support vector networks, to name several, each with multiple variants. The available variations are somewhat akin to programming languages. Many tasks may be implemented by several languages, but each programming language has properties and characteristics that may lend it to greater suitability for a particular problem.

Each machine learning (ML) algorithm generally defines a model by being trained on a training set of data, and then being deployed on live or production data for implementing a classification or regression based on patterns derived from the training data. Classification generally involves identifying one of a number of qualitative bins or categories based on the input data; regression typically results in a quantitative or continuous value. Training of the model based on the algorithm uses a data set that embodies the relations and associations expected by the data when deployed. A subset of the training data is also used for testing to ensure accurate results prior to applying the model to the live data.

Training the model is significant for ensuring that the trained model operates correctly and efficiently. During training, the model "learns" the training set through supervised learning, unsupervised learning and/or reinforcement learning. Accuracy of the trained model depends on sufficient learning. The training set is often rather large, and substantial computing resources are required to properly train the model. It is therefore beneficial to ensure an efficient and accurate training process.

SUMMARY

A training and optimization approach for an ML model employs a hyperparameter selection based on a quantity, named reward, which combines model performance associated with a hyperparameter configuration and a budget spent to achieve that performance. It helps to identify underperforming hyperparameter configurations having potential for improvement following sufficient training iterations. Hyperparameters define aspects of the model not learned or changed, but rather set variables about the learning process, similar to how databases use metadata to define invariant aspects of the data they store. Hyperparameter configurations are arranged based on whether the evaluated performance is converged, that is whether it is close to the actual expected performance. A hyperparameter configuration having a higher reward is retained, even though other hyperparameter configurations exhibit superior performance.

Hyperparameter configurations having a higher reward of performance at successive iterations are retained, and the hyperparameter configurations evaluated upon achieving their potential. A probability distribution of reward associated to a given hyperparameter configuration exhibits a peak at the most probable value of the reward at a given phase of the optimization process, and the hyperparameter configuration is evaluated based on a reward value randomly drawn from the corresponding reward distribution. In this manner, testing the hyperparameter configurations includes evaluating the hyperparameter configurations based on the probability distribution, and does not discard lower performing hyperparameter configurations if the corresponding reward exhibits potential for growth.

Configurations herein are based, in part, on the observation that conventional approaches to ML model training attempt to identify performance of several hyperparameter configurations, and often a substantial number, in order to identify the best performing hyperparameter configuration for deployment in a production model. Unfortunately, conventional approaches suffer from the shortcoming that performance is evaluated frequently during an iterative evaluation of hyperparameter configurations, and configurations exhibiting substandard performance are quickly discarded in favor of better early performers. However, training a model is an iterative process, and certain hyperparameter configurations may exhibit better performance after a number of initial iterations. Accordingly, configurations herein substantially overcome the shortcomings of early hyperparameter evaluation by computing a probability distribution of the reward showing whether evaluated performance is converged or not, meaning whether the evaluated performance is likely to change from continued iterations.

Hyperparameter configurations undergo a number of iterations during which performance is evaluated. Conventional approaches rank and discard underperforming configurations as soon as outpaced by other, better performing configurations. Evaluation therefore includes consideration of not only the performance, but also ensures that each considered hyperparameter configuration has matured sufficiently, or that hyperparameter configurations are not dropped before being given a chance to achieve full performance.

A particular hyperparameter configuration, depicted by a machine learning environment having a plurality of hyperparameter configurations, includes a set of hyperparameters applicable to a machine learning model. A method for identifying a hyperparameter configuration for deployment generates a plurality of hyperparameter configurations applicable to the model. Each hyperparameter configuration is iteratively evaluated for a performance and an associated reward distribution demonstrating whether the evaluated performance will remain stable during successive iterations. Evaluation includes determining when a potential for improvement from additional iterations has subsided. Hyperparameter configurations are ranked based on the reward randomly drawn from the corresponding distribution. Therefore, hyperparameter configurations that appear as underperformers have a chance to continue iterative performance evaluations which is decreasing with respect to the increasing amount of budget spent on that configuration.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

In the discussion that follows, particular features and advantages of the disclosed approach are shown in use in a development system for ML based applications using the hyperparameter configuration selection as described herein. Manual selection of hyperparameters may be attempted by developers, and experienced data scientists may intuitively identify satisfactory hyperparameters, however the disclosed approach automates the generation and testing of a large pool of hyperparameter configurations and evaluates performance more fully than conventional or manual approaches.

Typical machine learning algorithms have parameters, so called hyperparameters, that are not optimized during the training phase. Therefore, since hyperparameters affect a model's performance, in a conventional setting they are usually tuned by a human, in order to build a better performing model. The more complex an algorithm, the more hyperparameters it has and therefore it is more time consuming to tune such algorithms. Conversely, complex algorithms yield significantly better results. In order to save time and/or to allow less experienced engineers to build models using advanced machine learning algorithms, it can be beneficial to automate the hyperparameter tuning process. Conventional hyperparameter optimization algorithms have attempted to solve that problem. In general, conventional algorithms have two inputs: 1) a pool of hyperparameter configurations (i.e. a set of hyperparameter value arrays) and 2) a budget (e.g. computation time, number of iterations) algorithm can use to find the optimal configuration (hyperparameter values that give highest model performance) based on the first input.

In these conventional approaches, at each iteration of the optimization process, performance of the available hyperparameter configurations is computed, then only performance based ranking of the configurations is carried out and a certain number of top configurations are promoted to the next step of the optimization process. The remainder are discarded, so that the optimization algorithm doesn't spend resources on them in the future iterations to save compute power and time. This process is repeated until the provided budget is spent.

Figure 1:
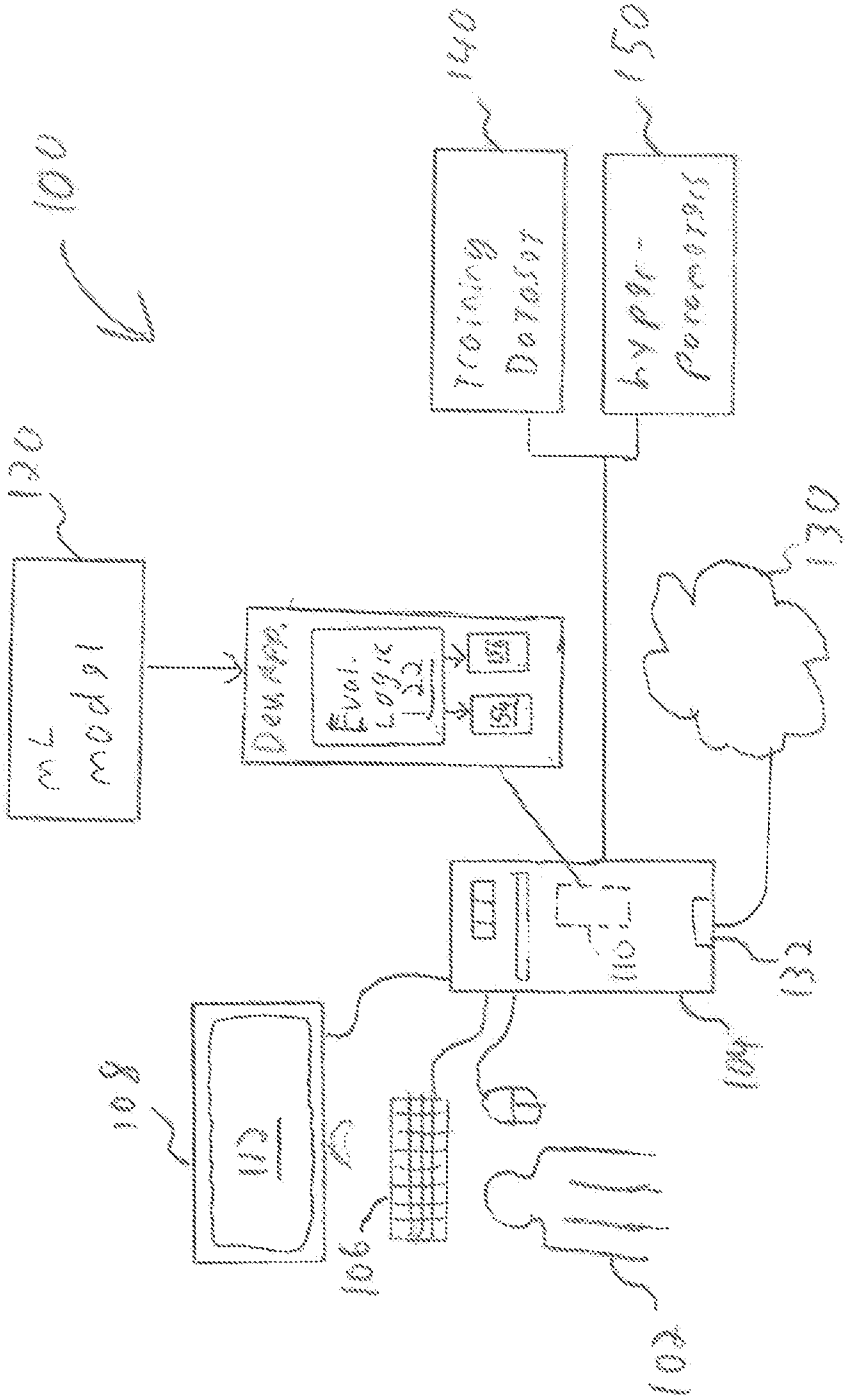
FIG. 1 is a context diagram of a machine learning and artificial intelligence (AI) development system suitable for use with configurations herein.

FIG. 1 is a context diagram of a machine learning development system suitable for use with configurations herein. Referring to FIG. 1, an example development system 100 provides a development application 110 for generating, optimizing and testing an ML model 120. A developer 102 such as a data scientist or software engineer generally develops the model 120. The model 120 is directed to a suitable ML representation such as a neural network, decision tree or similar derivative. A typical full development cycle typically includes training, validation, testing, and deployment, where the hyperparameter configuration is selected as part of the validation phase. The developer 102 employs a local machine 104, having input/output (I/O) devices such as a keyboard 106 and a visual display 108.

ML model 120 computation activities often require substantial computing resources, and accordingly, much of the training, testing and deployment activity invokes a computational resource such as AWS® (Amazon Web Services) or GOOGLE® cloud. An interface 132 to a public access network 130 such as the Internet is often employed for ML development for invoking these fee-for-services entities, underscoring the need for efficient and effective selection of hyperparameters.

One of the considerations in convergence of the performance is whether additional iterations are feasible to identify better performing hyperparameter configurations. Exhaustive iterations of training and performance evaluations reach a point of diminishing returns, where successive iterations are unlikely to yield better or different results. Hyperparameter selection is accompanied by a budget, typically in terms of computing resources. As the computational resources incur a cost, efficiency suggests evaluating the hyperparameter configurations until the reward distribution is unlikely to yield different peak performers. Accordingly, a predetermined budget is often allocated sufficient to identify a convergence of the reward distribution.

In an example configuration, a budget is determined for evaluation of the set of hyperparameter configurations, such that the budget defines an allocation of computing resources for computing the performance and reward distribution. The application 110 determines the convergence based on a number of training iterations expended for evaluating each of the hyperparameter configurations and a remaining budget from the predetermined budget. In other words, a hyperparameter configuration that has undergone relatively few iterations as allowed by the budget will be deemed to have additional iterations to demonstrate an improved performance. A hyperparameter configuration that has few iterations remaining given the budget will be deemed unlikely to change significantly from additional iterations.

During development, the development application 110 directs a training data set 140 to be invoked with a hyperparameter configuration 150 for training the model 120. Typically a portion of the available data will be used for the training data set 140 and a portion saved for testing the resulting classification or regression results. Training often involves many hyperparameter configurations 150, and the development application includes evaluation logic 122 to evaluate the performance and probability for each, and renders the results in a graphical rendering 112 such as a ranking on the visual display 108. Other forms, such as a visual rendering of the reward distribution as in FIGS. 3A-3B below, or other suitable indication, may also be invoked to indicate the best or set of converged (highly probably) better performing hyperparameter configurations.

Figure 2:
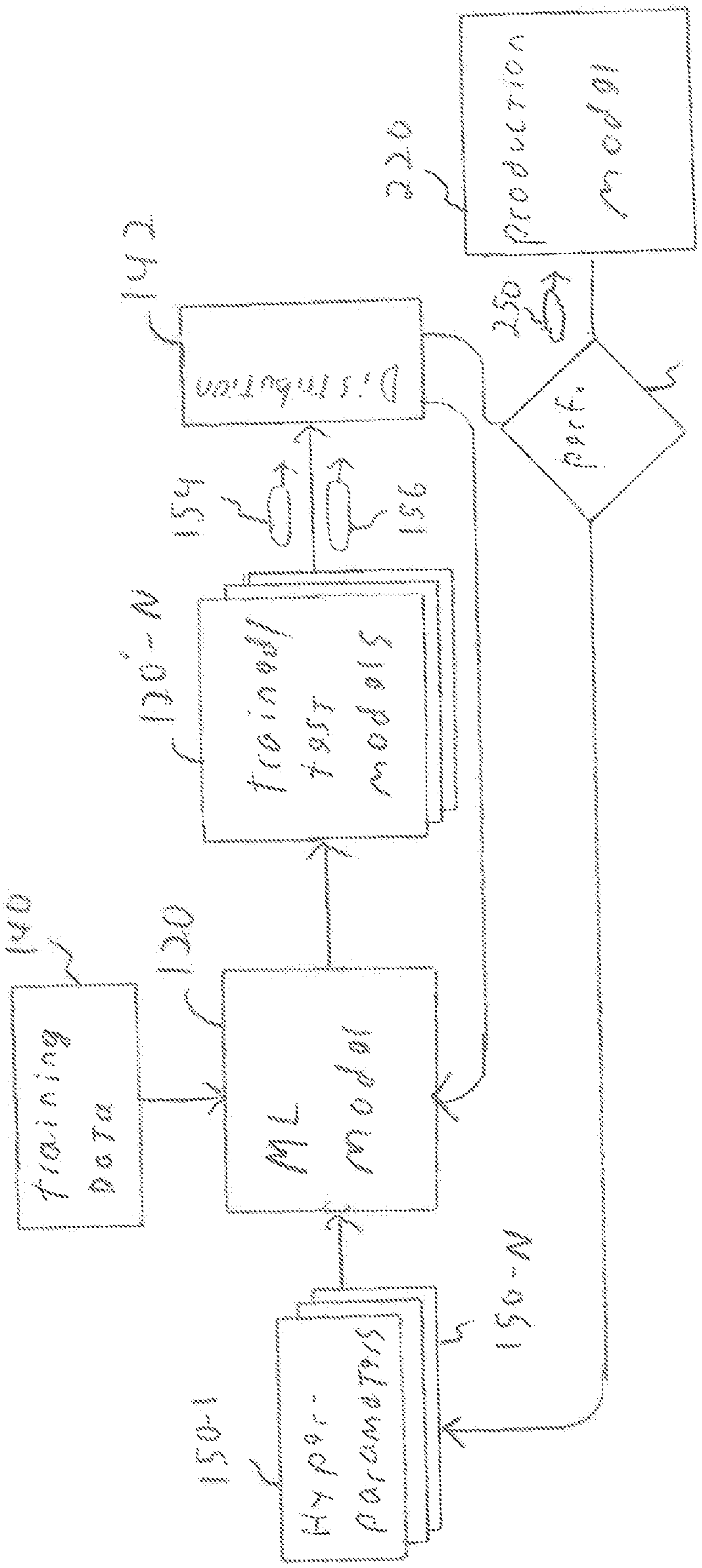
FIG. 2 is a data flow diagram of hyperparameter optimization in the environment of FIG. 1.

FIG. 2 is a data flow diagram of hyperparameter optimization in the environment of FIG. 1. Referring to FIGS. 1 and 2, in the machine learning environment 100 having a model 120 and hyperparameters 150 affecting training of the model, a method of selecting the hyperparameters for improving performance of the model includes receiving a plurality of hyperparameter configurations 150-1 . . . 150-N (150 generally). Each hyperparameter configuration 150 of the plurality of hyperparameter configurations has a set of hyperparameters applicable to the model 120 and a set of training data 140 for use in training the model. Many hyperparameters may be employed, and generally define fixed aspects about the model 120 and the training, such as a number of neurons and layers in a neural network, a learning rate or a number of trees in a random forest. The process of selecting hyperparameters is often referred to as hyperparameter tuning.

The development application 110 receives, via direction from the user interface, the dataset 140. The hyperparameter configurations 150 may be created or generated from any suitable source. Automation may be employed, and experienced data scientists may also prefer to define specific hyperparameter configurations. The number of initial hyperparameter configurations for evaluation may easily exceed 500, for example, and therefore is not feasible for manual computation or evaluation. Configurations herein improve the processing and performance of the computer 104 and application 110 by defining data structures and operations that reduce the overall computer burden and machine cycles required for selecting the hyperparameter configuration for production.

The application 110 evaluates each hyperparameter configuration 150 based on training iterations, such that each training iteration yields the performance 154 and the reward distribution 156 based on the number of iterations. Each iteration involves a portion or subset of a full dataset to result in a training configuration 120'-N from the models 150 trained using a respective set of hyperparameter configurations 150-N, and performance is evaluated at each iteration to determine how each hyperparameter configuration 150 is progressing. Performance and testing involves any suitable metric. The application 110 iterates over each hyperparameter configuration 150 of the plurality of hyperparameter configurations, and iteratively trains model 120 coupled with each hyperparameter configuration 150 on the training data 140. For each hyperparameter configuration 150, at each iteration, an evaluation including the performance 154 and corresponding reward distribution 156 is computed for a current iteration. Thus, there is a double nested iteration of each hyperparameter configuration at each increment of training.

The application 110 generates, for each hyperparameter configuration 150, a distribution 142 of the reward based on a random value exceeding the performance, discussed further below with respect to Table I. The application 110 determines, for each hyperparameter configuration, whether the performance corresponding to the respective training iteration is accurate based on the reward distribution converging. From the determination, the application 110 concludes whether to pursue additional training iterations for the respective hyperparameter configuration 150, or if the computed performance is accurate and unlikely to change from successive iterations.

From the distribution 142, a ranking can be defined for each hyperparameter configuration based on the reward randomly drawn from the corresponding reward distribution. The application 110 discards hyperparameter configurations 150-N with lowest reward values. In the example configuration, the evaluation logic 122 in the development application 110 computes, for each hyperparameter configuration 150, a performance 154 and a corresponding reward distribution 156. It then ranks the hyperparameter configurations based on the reward, and renders an indication of each hyperparameter configuration along with the corresponding reward. The rendering may be in any suitable form, such as a graph as depicted below or a tabular form. Evaluation of higher performing configurations 150 leads to a determination of which hyperparameter configuration 250 to advance for use with the production model 220. Hyperparameter configurations that do not exhibit early standout performances can therefore acquire a higher reward value as well, which will allow additional iterations to demonstrate their true performance. This is in contrast to conventional approaches which perform a strict ranking at each iteration and discard the lower performing hyperparameter configurations at an early stage.

Figure 3A:
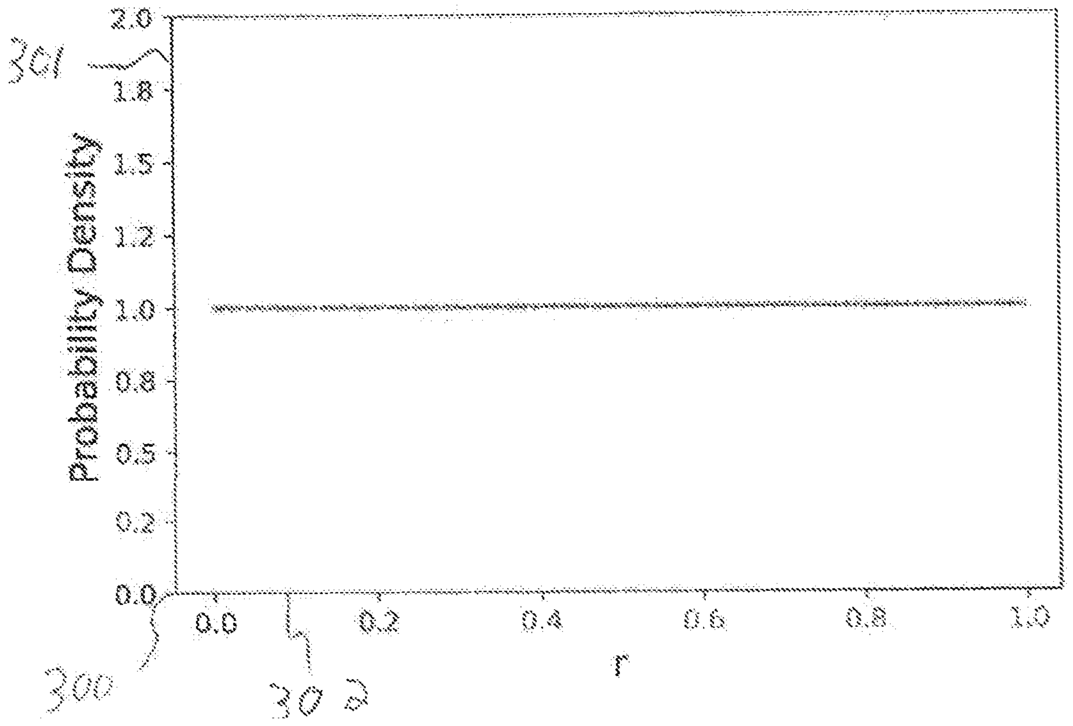
FIGS. 3A and 3B are graphs depicting a distribution of reward.
Figure 3B:
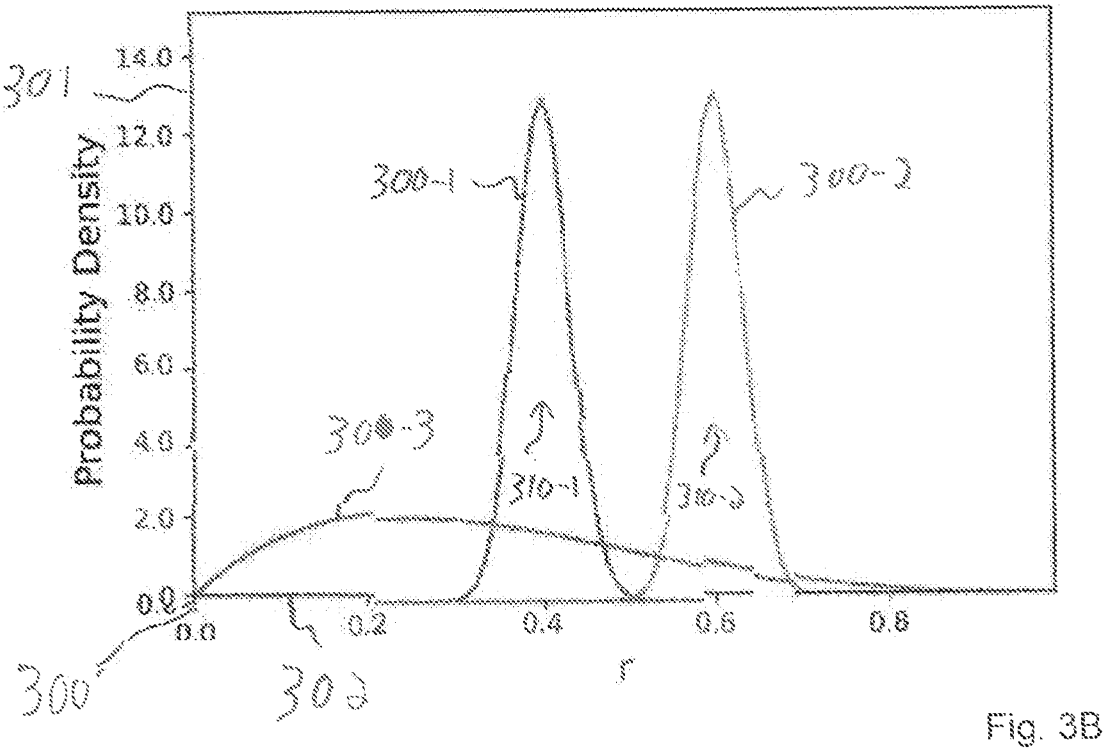

FIGS. 3A and 3B are graphs depicting a distribution of reward. FIGS. 3A, 3B and Table 1 depict an example approach for computing the reward distribution exhibited by particular hyperparameter configurations. The disclosed approach is concerned with ranking hyperparameter configurations. Instead of rigidly sorting them according to the associated model performance, the following procedure is disclosed: introduce a random variable, reward r, characterized by the beta distribution, Beta(S, F). Each hyperparameter configuration 150 is associated with the beta distribution. The following describes the link between reward r and model performance: once we compute the model performance metric (for simplicity, assume that performance metric ranges from 0.0 to 1.0; other ranges may be used) for a given configuration, the corresponding beta distribution is updated: if the value of a metric is greater than a random number drawn from the uniform distribution then the number of iterations spent so far on the configuration is added to the parameter S, otherwise it is added to F. This update modifies the shape of the beta distribution and the value of the expected reward. Initially, before commencing the optimization process, we don't know the value of the reward a given configuration can yield therefore the distribution of the corresponding reward is described by Beta(S=1, F=1) meaning that every possible value of r is equally probable, shown in FIG. 3A. The pseudo-code for computing this particular distribution is given in Table I. If a sufficient number of iterations is spent on a given configuration, it results in a performance metric that is not going to change significantly anymore and corresponding beta distribution has a prominent peak, at a specific value of r which is not going to move and thus the expected reward is nearly constant. In the case where the number of iterations spent on the configuration is less than the optimal number, then the configuration didn't have a chance to show its full potential, and the corresponding model performance metric is not near the optimal value that configuration can yield given sufficient number of iterations. In this scenario the corresponding beta distribution doesn't have a strong peak, it is flatter, the peak can relocate, and the expected reward can change after additional iterations. So, the shape of the beta distribution tells us whether configuration revealed its full potential or not or, in other words, whether it reached its corresponding expected performance.

TABLE I

```
Hyperparameter_configurations # list of hyperparameter configurations
N #number of hyperparameter configurations
S_i = F_i = 1 #initializing parameters beta distribution
num_of_iters #number of iteration used to build a model at a given phase
of optimization process
for i = 1, 2, . . . , N do
   train model with hyperparameters given by
   hyperparameter_configurations [i]
   m = performance metric of the model #ranges from 0 to 1
   If m > random ( )
      S_i = S_i + num_of_iters
   else
      F_i = F_i + num_of_iters
Sample r_i from beta ( S_i, F_i )
Rank configurations based on r_i
```

Table 1 shows a particular configuration of the performance prediction. Referring to FIGS. 2, 3A and 3B, in the approach of Table 1, computing the reward distribution includes, for each hyperparameter configuration 150, iteratively training the algorithm on the set of training data 140 using the hyperparameter configuration. At each iteration, compute the performance and generate the random value within a range defined by the performance metric. Compare the random number to the computed performance, and if the computed performance is greater than the random number, add a value equal to the number of iterations to a success counter S. If not, add the value equal to the number of iterations to a failure counter F. A graph 300-1 . . . 300-3 (300 generally) is generated for each hyperparameter configuration 150, such that the graph is characterized by a single peak indicating most probable values of the reward and the shape of the graph tells us whether computed performance accurately denotes an actual performance.

A data structure stores the reward and performance for each iteration of each hyperparameter configuration, resulting in a substantial quantity of storage depending on the number of hyperparameter configurations and the number of iterations. Data exhibiting the disclosed peaks may be stored in a graphical, tabular or other suitable form for exhibiting a coalescing of higher performance values and higher reward values. A robust output may include a range of highly probable, highly performing hyperparameter configurations, as a single scalar representation (ranking) may not accurately denote an optimal hyperparameter configuration when only distinguished by relatively small values.

In the example of FIGS. 3A and 3B, the graphs take the form of line patterns as shown by \graphs 300-1 . . . 300-3. In order to overcome the problem of early discard of later performing hyperparameter configurations 150, we introduce exploration in the search process through Thompson sampling. This associates the beta distribution, Beta(S=1, F=1) (FIG. 3A), to each hyperparameter configuration 150 which is updated according to the performance metric of the model 120 corresponding to a given hyperparameter configuration 150. In such a setting, lower performing configurations wouldn't be necessarily dropped after a couple of iterations because ranking is based on the reward sampled from the respective beta distributions, shown in FIG. 3B.

When a sufficient amount of budget, (e.g. number of iterations, execution time), is spent on the respective hyperparameter configurations 150, the associated rewards are converged and the probability that a lesser performing configuration is ranked below the better one is very high.

Continuing to refer to the graphs in FIGS. 3A and 3B, before the optimization process is started all values of reward r are equally probable, therefore the prior distribution for all hyperparameter configurations is Beta(S=1, F=1)—a uniform distribution, shown in FIG. 3A. The optimization sequence performs ranking of the configurations after each iteration and in order to do so r is randomly drawn from the beta distribution corresponding to each configuration. In FIG. 3B, the likelihood to be optimal for configuration 300-1 is very small because the chance that its expectation value of r gets larger than that of configuration 300-2 is negligible, denoted by the relatively high probability peaks 310-1, 310-2. Configuration 300-3 is much flatter and even though it is shifted to the left and the expectation value of r is the smallest, the related uncertainty is so large that it has a chance to become most optimal configuration and thus additional resources (iterations) should be performed until the performance 154 is converged, possibly achieving a substantially greater performance.

In Table I, the reward is based on a random value drawn from the uniform distribution and a model performance within a range of the (0.0 . . . 1.0), such that the random variable compensates for a performance metric having a potential for improving upon additional iterations. Computing the reward distribution 156 further comprises accumulating, for a random value drawn from a range of the performance, a value indicative of the random parameter value exceeding the performance and a value indicative of the random parameter being less than the performance.

The graphed configurations 300-1 . . . 300-3 illustrate that, based on the distribution for a hyperparameter configuration of the plurality of hyperparameter configurations, that an increase in the performance may occur from successive training iterations. The evaluation logic 122 of the hyperparameter configuration computes, for each hyperparameter configuration 150 of the plurality of hyperparameter configurations, a distribution of the reward 156, such that the expected reward is indicative of accuracy of the performance of the hyperparameter configuration. The application 110 renders a graphical indication 300 of, for each hyperparameter configuration, the reward on axis 302 and the probability density on axis 301, such that the location of the peak indicates most probable value of the reward which is not accurate unless sufficient number of iterations (e.g. experiments, trials) are carried out.

Figure 4:
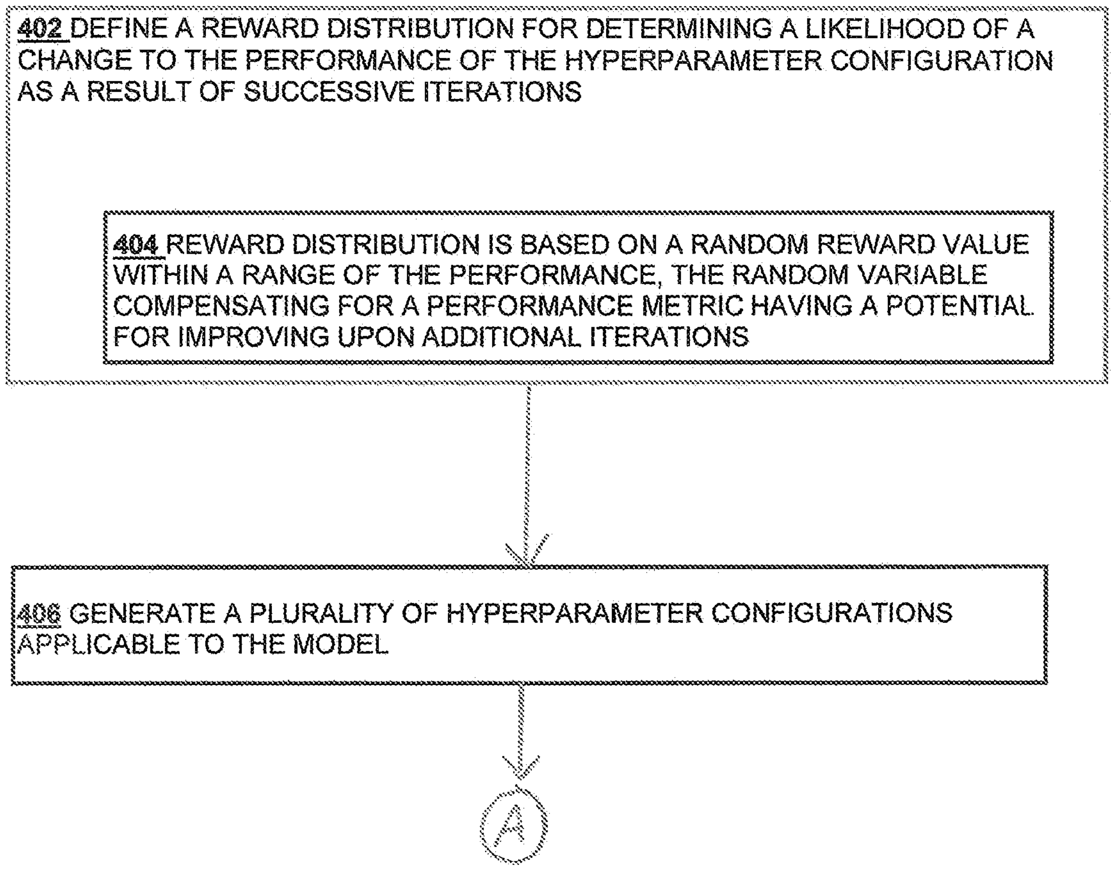
FIG. 4 is a flowchart of hyperparameter configuration testing and selection in the environment of FIG. 1 according to the approach of FIGS. 2 and 3A-3B.
Figure 4:
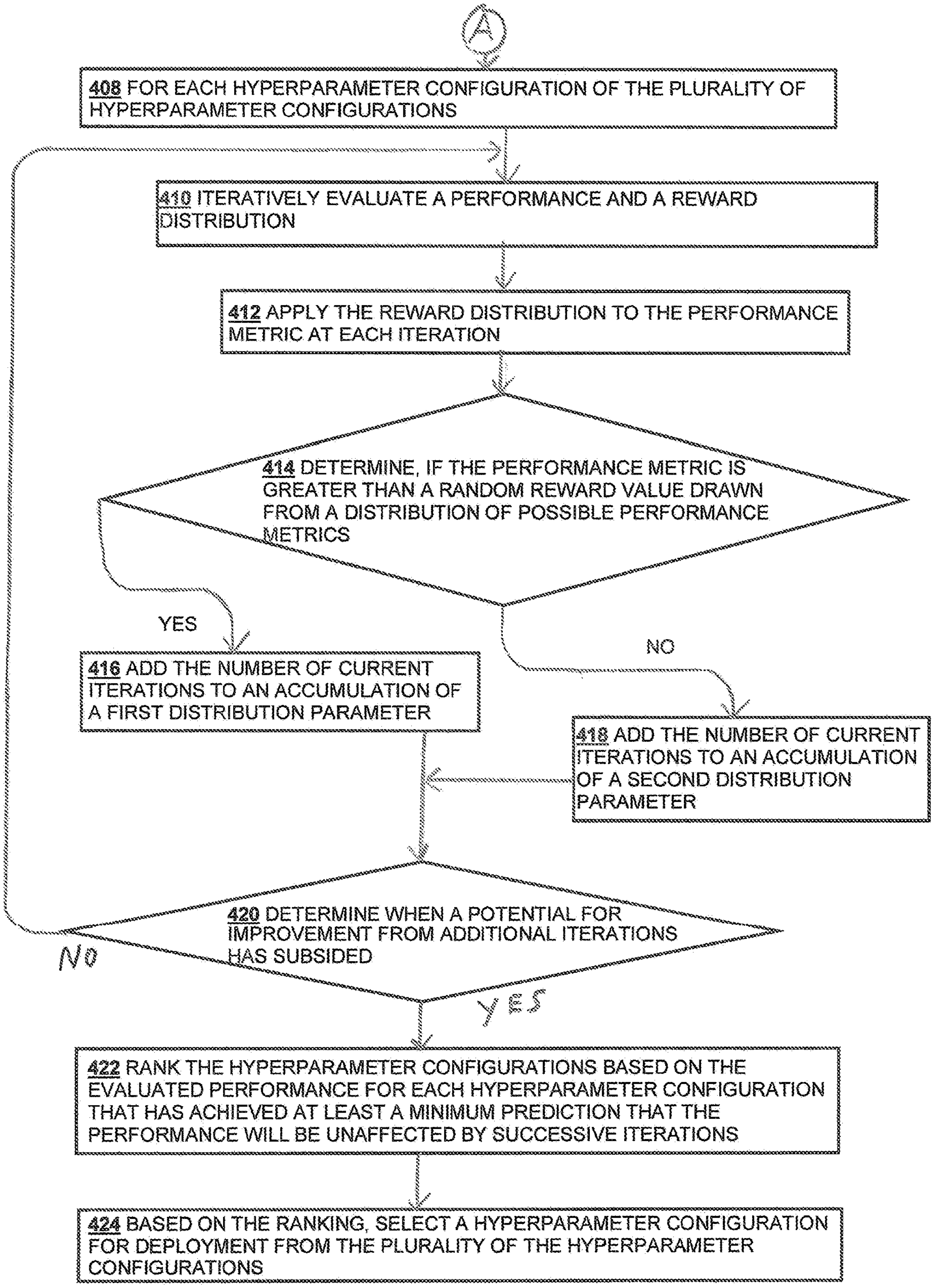

FIG. 4 is a flowchart 400 of hyperparameter configuration testing and selection in the environment of FIG. 1 according to the approach of FIGS. 2 and 3A-3B. Referring to FIGS. 1-4, in a machine learning environment 100 having a plurality of hyperparameter configurations, each hyperparameter configuration includes a set of hyperparameters applicable to a machine learning model 120. The method for identifying a hyperparameter configuration for deployment includes, at step 402, defining a reward distribution for determining a likelihood of a change to the performance of the hyperparameter configuration as a result of successive iterations. In the example configuration, the reward distribution is based on a random value within a range of the performance, such that the random variable compensates for a performance metric having a potential for improving upon additional iterations, as depicted at step 404.

A test agent or testing utility generates a plurality of hyperparameter configurations 150 applicable to the model 120, as depicted at step 406. At step 408, for each hyperparameter configuration of the plurality of hyperparameter configurations, the application 110 iteratively evaluates the performance and the corresponding reward distribution that indicates or estimates a likelihood or prediction that the evaluated performance is accurate, as depicted at step 410. A stronger prediction indicates that enough iterations have occurred, based on the allotted budget, that the evaluated performance is unlikely to change significantly. The application 110 applies the reward distribution, for assessing a likelihood of hyperparameter performance, to the performance metric at each iteration, depicted at step 412. Applying the reward distribution refers to the accumulation of a distribution parameter encompassing performance and budget—as the budget is consumed, it becomes less likely that the performance will change and the value added to the distribution parameter increases with the number of iterations to reflect that. In other words, the available budget is consumed (decreases) as the number of iterations increases, and by accumulating the distribution parameter based on the number of iterations, a convergence to a particular performance is observed as the budget approaches exhaustion, as now described further.

At each iteration, a check is performed to determine if the performance metric is greater than a random value, as depicted at step 414. If so, then the number of current iterations is added to an accumulation of a first distribution parameter, as disclosed at step 416, and if not, number of current iterations is added to an accumulation of a second distribution parameter, as depicted at step 418. Since the performance metric and random number are both within the same range (0.0-1.0, in the example shown), a high performance score ensures that the corresponding hyperparameter configuration will often score above the random value whereas a small performance score will often end up less than that number. The corresponding reward distributions will reflect that process allowing the hyperparameter configuration a chance to demonstrate a higher performance over time, instead of being eliminated early with a low performance score after only relatively few iterations.

Based on the shape of the reward distribution the application 110 determines when a potential for improvement from additional iterations has subsided, as shown at step 420. Hyperparameter configurations are typically evaluated based on a budget of computation cycles or similar resource allocation. This prevents a disproportionate expenditure of resources on options that yield diminishing returns. As described above, this budget of resources is taken to determine when the hyperparameter configuration has completed, meaning that the evaluation, or graphic "peaks," have matured sufficiently to indicate that further change within the allocated budget is unlikely. Generally this occurs when each hyperparameter configuration 150 has a relatively well defined peak 310. A flatter graph, such as 300-3, is deemed to not have converged, or exhibited full potential yet.

The application 110 then ranks the hyperparameter configurations 150 based on the reward value randomly drawn from the reward distribution for each hyperparameter configuration. Based on the ranking, a hyperparameter configuration 250 is selected for deployment from the plurality of the hyperparameter configurations.

Configurations herein employ a computing device for training a machine learning (ML) model based on a set of hyperparameters. Such a computing device includes a memory for storing instructions defining the computer program, a processor for launching and executing the instructions, data structures for representing the ML model in a manner that improves the performance and functioning of the machine, a user interface for receiving direction and rendering results, and an interface to a server farm, external computing resource or computing engine for delegation of the training, testing, validation and production phases associated with deployment of an ML model, hyperparameters and a corresponding data set.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. In a machine learning environment having a model and hyperparameters affecting training of the model, a method of selecting the hyperparameters for improving performance of the model, the method comprising:
- receiving a plurality of hyperparameter configurations, each hyperparameter configuration of the plurality of hyperparameter configurations having a set of hyperparameters applicable to a model and a set of training data;
- computing, for each hyperparameter configuration, a performance and a corresponding reward distribution indicating that the performance is converged to indicate an accuracy of the actual performance of the respective hyperparameter configuration;
- ranking the hyperparameter configurations based on a reward value randomly sampled from the reward distribution; further comprising:
  - for each hyperparameter configuration,
    - iteratively applying the set of training data using the hyperparameter configuration;
    - at each iteration, computing the performance;
    - at each iteration, generating a random value within a range defined by the performance;
    - comparing the random value to the computed performance, and
  - if the computed performance is greater than the random value,
    - adding a value equal to the number of iterations to a success counter, and if not
    - adding the value equal to the number of iterations to a failure counter;
- generating a distribution of the reward for each hyperparameter configuration, with the shape of the distribution denoting that the computed performance accurately denotes an actual performance, further comprising:
  - computing, for each hyperparameter configuration of the plurality of hyperparameter configurations, a distribution of the reward, the distribution indicative of whether the performance of the hyperparameter configuration is converged, the distribution representable as a graph denoting, for each hyperparameter configuration, a convergence of performance denoted by a peak at a location on the graph; and
  - terminating and discarding lower ranking hyperparameter configurations upon determining a convergence indicative of accurate performance and that a potential for improvement from additional iterations has subsided; and
- selecting at least one of the best performing hyperparameter configurations based on the ranking of hyperparameter configurations.

2. The method of claim 1 wherein computing the reward distribution further comprises accumulating, for a random value drawn from a range of the performance, a value indicative of the random value exceeding the performance and a value indicative of the random value being less than the performance.

3. The method of claim 1 further comprising:

evaluating each hyperparameter configuration based on training iterations, each training iteration yielding a performance and a reward distribution based on the number of iterations;

generating, for each hyperparameter configuration, a distribution of the reward based on whether a selected random value exceeds the performance or not;

determining, for each hyperparameter configuration, whether the distribution represents an converged performance for the respective training iteration; and based on the determination of convergence, concluding whether to pursue additional training iterations for the respective hyperparameter configuration.

4. The method of claim 3 further comprising:

concluding, based on the reward distribution for a hyperparameter configuration of the plurality of hyperparameter configurations, that an increase in the performance may occur from successive training iterations; and continuing the successive iterations until a predetermined budget of allotted computations resources has been expended.

5. The method of claim 4 further comprising receiving a budget, the budget defining an allocation of computing resources for computing the performance and reward distribution.

6. The method of claim 5 further comprising determining the convergence based on a number of training iterations expended for evaluating each of the hyperparameter configurations and a remaining budget from the predetermined budget.

7. The method of claim 1 further comprising:

receiving, from a user interface, the model, the set of training data, and the plurality of hyperparameter configurations;

iterating over each hyperparameter configuration of the plurality of hyperparameter configurations;

iteratively applying the training set to the model based on each hyperparameter configuration;

for each hyperparameter configuration, at each iteration, computing the performance and corresponding reward distribution for a current iteration;

ranking each hyperparameter configuration based on the randomly drawn value from the reward distribution taking into account computed performance; and discarding hyperparameter configurations that have the smallest rewards in the ranking, and advancing the hyperparameter configurations having a reward greater than the discarded hyperparameter configuration for further iterations.

8. The method of claim 1, wherein the plurality of hyperparameter configurations are based on training of a common model.

9. The method of claim 1, further comprising, in a production phase, invoking the selected hyperparameter configuration for execution of a production model.

10. In a machine learning environment having a plurality of hyperparameter configurations, each hyperparameter configuration including a set of hyperparameters applicable to a machine learning model, a method for identifying a hyperparameter configuration for deployment, comprising:

generating a plurality of hyperparameter configurations applicable to the model;

for each hyperparameter configuration of the plurality of hyperparameter configurations, iteratively evaluating a performance and a reward distribution indicating whether the evaluated performance will change during successive iterations, and indicating when a potential for improvement from additional iterations has subsided, based on:

introducing a procedure based on a random number to update the reward distribution with the performance of the hyperparameter configuration on a given iteration indicating a likelihood of a change to the performance of the hyperparameter configuration as a result of successive iterations; and carrying out the procedure at each iteration;

determining, at each iteration, if the performance metric is greater than a random value, the random value drawn from a distribution of possible performance metrics, and if so, adding the number of current iterations to an accumulation of a first distribution parameter, and if not, adding the number of current iterations to an accumulation of a second distribution parameter;

ranking the hyperparameter configurations based on the reward randomly drawn from the distribution evaluated for each hyperparameter configuration;

selecting at least one of the best performing hyperparameter configurations based on the ranking of hyperparameter configurations;

terminating and discarding lower ranking hyperparameter configurations upon determining a convergence indicative of accurate performance and that the potential for improvement from additional iterations has subsided.

11. The method of claim 10 further comprising, based on the ranking, selecting a hyperparameter configuration for deployment from the plurality of the hyperparameter configurations.

12. The method of claim 10 wherein the reward distribution defines a prediction estimator based on a random value within a range of the performance.

13. A computer program embodying program code on a non-transitory medium that, when executed by a processor, performs steps for implementing a method of selecting hyperparameters for improving performance of a machine learning (ML) model, the method comprising:

receiving a plurality of hyperparameter configurations, each hyperparameter configuration of the plurality of hyperparameter configurations having a set of hyperparameters applicable to a model and a set of training data;

computing, for each hyperparameter configuration, a performance and a corresponding reward distribution indicating whether the performance is converged to indicate an accuracy of the actual performance of the respective hyperparameter configuration;

storing, in a data structure corresponding to each hyperparameter configuration, a representation of the performance and the reward distribution;

ranking the hyperparameter configurations based on a reward value randomly sampled from the reward distribution; further comprising:

for each hyperparameter configuration, iteratively applying the set of training data using the hyperparameter configuration;

at each iteration, computing the performance;

at each iteration, generating a random value within a range defined by the performance;

comparing the random value to the computed performance, and if the computed performance is greater than the random value, adding a value equal to the number of iterations to a success counter, and if not adding the value equal to the number of iterations to a failure counter;

generating a distribution of the reward for each hyperparameter configuration, with the shape of the distribution denoting that the computed performance accurately denotes an actual performance, further comprising:

computing, for each hyperparameter configuration of the plurality of hyperparameter configurations, a distribution of the reward, the distribution indicative of whether the performance of the hyperparameter configuration is converged, the distribution representable as a graph denoting, for each hyperparameter configuration, a convergence of performance denoted by a peak at a location on the graph;

terminating and discarding lower ranking hyperparameter configurations upon determining a convergence indicative of accurate performance and that a potential for improvement from additional iterations has subsided; and selecting at least one of the best performing hyperparameter configurations based on the ranking of hyperparameter configurations.

14. The computer program of claim 13 wherein computing the reward distribution further comprises accumulating, for a random value drawn from a range of the performance, a value indicative of the random value exceeding the performance and a value indicative of the random value being less than the performance.

15. The computer program of claim 13 wherein the reward distribution is based on a random value within a range of the performance, the random value compensating for a performance metric having a potential for improving upon additional iterations.

* * * * *